United States Patent [19]
Jones

[11] 3,790,423
[45] Feb. 5, 1974

[54] METHOD OF BONDING USING A POLYAMIDE RESIN
[75] Inventor: Faber B. Jones, Nowata, Okla.
[73] Assignee: Phillips Petroleum Company, Bartlesville, Okla.
[22] Filed: Nov. 22, 1971
[21] Appl. No.: 201,106

Related U.S. Application Data
[63] Continuation of Ser. No. 790,882, Jan. 13, 1969, abandoned.

[52] U.S. Cl. ............. 156/331, 117/161 P, 161/214, 161/227, 260/78 R
[51] Int. Cl. ..... C09j 5/06, B32b 15/08, B32b 27/34
[58] Field of Search.. 117/161 P; 156/331; 161/214, 161/227; 260/78 R, 78 S

[56] References Cited
UNITED STATES PATENTS

| | | | |
|---|---|---|---|
| 3,379,695 | 4/1968 | Wolfes et al. | 260/78 |
| 3,496,002 | 2/1970 | Wolfes et al. | 117/21 |
| 2,252,554 | 8/1941 | Carothers | 260/78 R |
| 3,492,368 | 1/1970 | Coover et al. | 260/857 |
| 3,475,387 | 10/1969 | Carter et al. | 260/78 R |
| 3,696,074 | 10/1972 | Tsuda et al. | 260/78 R |

OTHER PUBLICATIONS

Gorton, "Adhesive Properties of Polyisophthalamides", Journal of Applied Polymer Science, Vol. 9, No. 11 (1965). pp. 3,753–3,758.

Primary Examiner—Daniel J. Fritsch
Assistant Examiner—Robert A. Dawson
Attorney, Agent, or Firm—Quigg et al.

[57] ABSTRACT

Polyamides, useful as hot-melt adhesives, are prepared by condensing: (a) mixtures of at least two reaction products selected from the group consisting of the reaction product of a diamine and isophthalic acid, the reaction product of a diamine and terephthalic acid, and the reaction product of a diamine and a mixture of isophthalic acid and terephthalic acid or (b) the reaction product of a diamine and a mixture of isophthalic acid and terephthalic acid.

9 Claims, No Drawings

METHOD OF BONDING USING A POLYAMIDE RESIN

This is a continuation of application Ser. No. 790,882, filed Jan. 13, 1969 and now abandoned.

This invention relates to polyamides and to a process for their use.

Polyamides have been made in the past by condensing alpha, omegaalkane diamines, usually 1,6-hexane diamine with a mixture of isophthalic acid and terephthalic acid. These polyamides, however, contain only a small amount of isophthalic acid, generally not more than 5 or 10 percent.

Surprisingly, it has been discovered that polyamides can be formed by condensing: mixtures of at least two reaction products selected from the group consisting of the reaction product of a diamine and isophthalic acid, the reaction product of a diamine and terephthalic acid, and the reaction product of a diamine and a mixture of isophthalic acid and terephthalic acid; or the reaction product of a diamine and a mixture of isophthalic acid and terephthalic acid.

Further, it has now been discovered that these polyamides are useful as hot melt adhesives.

Accordingly, an object of this invention is to provide polyamides. Another object of this invention is to provide for the use of these polyamides. Other aspects, objects, and advantages of this invention are apparent from a study of this disclosure and the appended claims.

The alpha, omega-alkane diamines which can be employed in this invention can be represented by the formula $H_2N-(CH_2)_n-NH_2$ where $n$ can be an integer from 10 to 14 inclusive. Suitable examples of these diamines are 1,10-decanediamine, 1,11-undecanediamine, 1,12-dodecanediamine, 1,13-tridecanediamine, and 1,14-tetradecanediamine.

The acids which can be employed in this invention are isophthalic acid and terephthalic acid. The weight ratio of isophthalic acid to terephthalic acid employed is in the range from 90:10 to 45:55.

The polyamides of this invention can be synthesized by any method known to the art for the production of conventional polyamides. For example, polyamides of this invention can be prepared by melt condensation of pre-formed diacid-diamine salts. The salts are prepared by admixing the diacid or diacids in the diamine solution in absolute ethanol. Mixing the diamine with the diacid in an alcohol solution produces an exothermic reaction as neutralization is effected. The crystalline salt is precipitated and recovered. After drying, each salt is checked for stoichiometry by measuring pH. Salts with a pH value between 6.5 and 7.5 are suitable for polymerization; i.e., a pH value between 6.5 and 7.5 indicates an equalmolar amount of diacid and diamine in the salt.

Melt polymerization of these salts or mixtures thereof is then effected. For example, the salts are charged to a reactor which is then charged with nitrogen. The temperature of the reactor is raised slowly, preferably about 5° C per minute or less, until the salt is melted to a liquid, usually between 150°–450° C. A moderate degree of reflux is then started immediately and maintained for about 1 to 24 hours. Water of reaction is removed and the reaction mixture is maintained at an elevated temperature, generally between 150°–450° C. Volatiles are removed and heating is continued for an additional short time, usually 15 minutes. The product is cooled under nitrogen and recovered. Further, the molecular weight of the polyamides can be varied by the use of acetic acid without appreciably affecting shear strength.

The polyamides of this invention can be employed as adhesives, and are particularly valuable as hot melt adhesives. It is widely agreed that a reasonable dividing line between low or moderate strength adhesives and high strength adhesives is a level of lap shear strength in the range of 1,000 to 2,000 psi. As is apparent, the polyamides of this invention surprisingly fall within or above this range, while polyamides known in the art procedures fall below this range.

The adhesive compositions of this invention can be applied to the surface or surfaces to be bonded by any prior art procedure. The surfaces to be bonded are then pressed together under sufficient pressure and temperature and for a sufficient time to form an adhesive bond. These conditions depend on the polyamide being employed; generally, a temperature ranging from 150°–300° C, a pressure of 10 psi or less and a time ranging from 1 to 15 minutes are employed. These polyamides can be used to bond materials such as plastics, woods, metals, ceramics, and the like.

This invention can be further illustrated by the following examples. The reactants, proportions and other specific conditions are presented as being typical and should not be construed to limit the invention unduly.

EXAMPLE I

Diacid-diamine salts were prepared from equimolar amounts of a diamine and a diacid. The diacid-diamine salts were formed by mixing of diacid and diamine solutions in absolute ethanol and subsequently mixing the diamine and diacid in alcoholic solutions at 78° C. An exothermic reaction was noted as neutralization was effected and a crystalline diacid-diamine salt was precipitated. Each salt was recovered, vacuum dried, and checked for stoichiometry of diacid and diamine by measuring the pH of a one percent aqueous solution of a sample of each. The salts from each run were found suitable for polymerization as all runs were found to have pH values between 6.5 and 7.5. The salts were prepared from recipes presented in Table I.

TABLE I

|  | Run 1 | Run 2 |
| --- | --- | --- |
| Diamine | 1,12-dodecanediamine | 1,12-dodececanediamine |
| Quantity | 1.0 mole | 1.0 mole |
| Diacid | terephthalic acid | isophthalic acid |
| Quantity | 1.0 mole | 1.0 mole |

EXAMPLE II

Melt polymerization of the salts of Example I was effected by charging the salts or mixtures thereof to a reactor. The reactors were evacuated and purged with nitrogen. The temperature of the reactors was raised at about 5° C per minute until the salts melted to a liquid, at about 240°–250° C. Reflux was started immediately and then the temperature was lowered and reflux was maintained at a moderate degree for about 3 hours. Water of the reaction was vented and the melt was then heated for another hour at 335° C. Any volatiles remaining were removed by vacuum, the melt was heated for an additional 15 minutes and then cooled under nitrogen. The product was then recovered for evaluation as an adhesive.

Prior to use, 1 × 4 × 0.065-inch aluminum (2024T alloy) coupons were vapor degreased in trichloroethylene, and then washed for 15 minutes at 70° C in a solution made up of 500 grams of water, 100 grams of sulfuric acid, and 50 grams of sodium dichromate. The coupons were then washed three times in distilled water and oven dried for 1 hour at 70°–80° C. The bonding procedure was carried out in a special positioning jig. The coupons were bonded to a close tolerance of 1/2-inch overlap in the bond test area with an adhesive thickness of 3–4 mils. The assemblies were heated in the jig at a pressure of 10 psi or less to a temperature determined by the particular hot-melt adhesive melting characteristics (150°–300° C depending upon the polymer). After a heating period of 15 minutes, the jig was cooled while closed. The bonded specimens were removed from the jig, carefully trimmed to remove any flash from the bonded edges, and conditioned 24 hours at room temperature before testing. Lap shear strength measurements were conducted using Instrom Model TT Universal Tester with a 10,000 pound load range. Specimens were tested to destruction at a strain rate of 0.05 inch per minute (ASTM method D1002-53T). Lap shear values are expressed in pounds per square inch (psi) of bonded area. All lap shear tests were run in duplicate and average values are reported; reproducibility was over 90 percent. The data are presented in Table II.

TABLE II

|  | Room Temp. Lap Shear Strength init. (psi) | at 65°C (psi) | at 105°C (psi) | %Lap Shear Strength retained at room temp. after 24 hr. immersion in boiling water (psi) |
|---|---|---|---|---|
| Mixed Copolymer[1] | 2240 | 82% | 91% | 85% (1900 psi) |
| Copolymer 1[2] | 410 | —[4] | — | — |
| Copolymer 2[3] | 2690 | 97% | 23% | 55% (1480 psi) |

[1] This mixed copolymer was prepared by melt polymerization of a mixture comprised of 50% (wt) of the salt of Run 1 and 50% (wt) of the salt of Run 2 of Table I [poly(dodecamethylene mixed-iso-and-terephthalamide)].
[2] This copolymer was prepared by melt polymerization of the salt of Run 1 of Table I [poly(dodecamethyleneterephthalamide)].
[3] This copolymer was prepared by melt polymerization of the salt of Run 2 of Table I [poly(dodecamethyleneisophthalamide)].
[4] Lap shear strength was not tested at these temperatures.

This example clearly shows that a mixed copolymer prepared by melt polymerization of a mixture of the salt of 1,12-dodecanediamine and terephthalic acid and the salt of 1,12-dodecanediamine and isophthalic acid retains better adhesive strength at elevated temperatures and in the presence of boiling water than would be expected from comparing properties of the respective copolymers. A new and useful result is thus obtained.

EXAMPLE III

Various polyamides were prepared and tested by the method of Examples I and II. Table III, following, presents a series of runs wherein mixed copolymers having various weight ratios of isophthalic and terephthalic acids are employed. The diamine employed was 1,12-dodecanediamine. Bonding temperature was also varied.

TABLE III

| Weight Ratio iso:tere[5] | Bonding Temp., °C | Lap Shear Strength, psi | | | |
|---|---|---|---|---|---|
|  |  | 25°C | 65°C | 105°C | Boiling Water[6] |
| 90–10 | 225 | 1917 | —[7] |  |  |
| 80–20 | 225 | 1880 |  |  |  |
| 60–40 | 225 | 1165 |  |  |  |
| 40–60 | 225 | 583 |  |  |  |
| 90–10 | 250 | 1940 |  |  |  |
| 80–20 | 250 | 1787 |  |  |  |
| 60–40 | 250 | 1513 |  |  |  |
| 40–60 | 250 | 673 |  |  |  |
| 90–10 | 275 | 2087 | 2570 | 2477 | 1730 |
| 80–20 | 275 | 2447 | 1942 | 2068 | 1430 |
| 60–40 | 275 | 1680 | 2108 | 2095 | 1550 |
| 40–60 | 275 | 847 |  |  |  |
| 20–80 | 275 | 747 |  |  |  |
| 10–90 | 275 | 487 |  |  |  |

[5] Isophthalic to terephthalic acid weight ratio.
[6] Measured at room temperature after 24-hour immersion in boiling water.
[7] Lap shear strength was not tested at these temperatures.

These examples show the materials having isophthalic to terephthalic ratios of 90–10 to 50–50 retained excellent strength at high temperature in the presence of boiling water; and that a critical dropoff in shear strength occurs in all instances as one goes from a ratio of 50–50 to 40–60 (isophthalic-terephthalic).

EXAMPLE IV

Table IV, following, presents runs effected as in Example III with the exception that 1,6-hexanediamine rather than 1,12-dodecanediamine was employed.

TABLE IV

| Weight Ratio iso:tere[5] | Bonding Temperature, °C | Lap Shear Strength at 25°C, psi |
|---|---|---|
| 60–40 | 275 | 678 |
| 50–50 | 275 | 370 |
| 40–60 | 275 | 520 |

[5] ibid. Table III.

This example shows that polymers prepared of lower molecular weight diamines ($C_6$) are not suitable as hot-melt adhesives.

EXAMPLE V

Table V, following, presents runs effected as above wherein 1,12-dodecanediamine was employed as the diamine, but wherein the molecular weight of the polyamides was varied by the use of acetic acid. Relatively high, medium, and low molecular weight polymers were prepared to determine what effect if any, that molecular weight would have on adhesive characteristics. Isophthalate to terephthalate weight ratios were 90–10 in all runs. The procedure was done according to Examples I and II.

TABLE V

| Molecular Weight | Bonding Temperature, °C | Lap Shear Strength at 25°C, psi |
|---|---|---|
| High | 225 | 1513 |
| Medium | 225 | 1917 |

TABLE V-Continued

| Molecular Weight | Bonding Temperature, °C | Lap Shear Strength at 25°C psi |
|---|---|---|
| Low | 225 | 1147 |

The above data demonstrate that as the molecular weight of the polyamide of the invention is varied the lap shear strength remains above 1,100 psi.

Reasonable variations and modifications are possible within the scope of this disclosure without departing from the spirit and scope thereof.

I claim:

1. In a process for bonding a first surface to a second surface comprising coating at least one of said first and second surfaces with a polyamide, pressing the thus coated surface to the other of said surfaces under suitable bonding conditions to form a bonded laminate, the improvement comprising said polyamide consisting essentially of a polycondensation product of 1,12-dodecane-diamine, isophthalic acid, and terephthalic acid, the weight ratio of the isophthalic acid to the terephthalic acid being in the range of from 90:10 to 45:55, the lap shear strength of the resulting bond of the polyamide coating to each of said first and second surfaces being at least 1,000 psi at 25° C.

2. A process in accord with claim 1 wherein at least 58 percent of said lap shear strength is retained after immersion of the laminate in boiling water for 24 hours.

3. A process in accord with claim 1 wherein said surfaces are selected from the class consisting of plastic, wood, metal and ceramics.

4. A process in accord with claim 1 wherein said surfaces are aluminum.

5. A process in accord with claim 1 wherein said ratio is in the range of 90:10 to 50:50.

6. A process in accord with claim 1 wherein said polycondensation product is the condensation product of (a) the reaction product of 1,12-dodecane-diamine and isophthalic acid, and (b) the reaction product of 1,12-dodecane-diamine and terephthalic acid.

7. A process in accord with claim 1 wherein said polycondensation product is the condensation product of the reaction product of 1,12-dodecane-diamine and a mixture of isophthalic acid and terephthalic acid.

8. A process in accord with claim 1 wherein said bonding conditions comprise a temperature in the range of about 150° C to about 300° C.

9. A process in accord with claim 6 wherein said surfaces are aluminum, and wherein said ratio is in the range of 90:10 to 50:50.

* * * * *